US012326318B2

(12) United States Patent
Lyles

(10) Patent No.: US 12,326,318 B2

(45) Date of Patent: Jun. 10, 2025

(54) HEATED BOW GRIP

(71) Applicant: John Lyles, Cherry Hill, NJ (US)

(72) Inventor: John Lyles, Cherry Hill, NJ (US)

(*) Notice: Subject to any disclaimer, the term of this patent is extended or adjusted under 35 U.S.C. 154(b) by 211 days.

(21) Appl. No.: 18/326,670

(22) Filed: May 31, 2023

(65) Prior Publication Data

US 2024/0401902 A1 Dec. 5, 2024

(51) Int. Cl.
*F41B 5/14* (2006.01)
*H05B 3/06* (2006.01)

(52) U.S. Cl.
CPC .............. *F41B 5/1484* (2013.01); *F41B 5/14* (2013.01); *F41B 5/1403* (2013.01); *H05B 3/06* (2013.01)

(58) Field of Classification Search
CPC ........ F41B 5/14; F41B 5/1484; F41B 5/1403; F41B 5/1442; F41B 5/148; H05B 3/06
USPC ........................................................... 124/88
See application file for complete search history.

(56) References Cited

U.S. PATENT DOCUMENTS

| | | | | |
|---|---|---|---|---|
| 5,585,026 A * | 12/1996 | Smith, Jr. | H05B 3/34 | 219/535 |
| 5,934,267 A * | 8/1999 | Briner | F41B 5/14 | 124/88 |
| 6,164,003 A * | 12/2000 | Miller | F41C 23/20 | 42/106 |
| 9,821,204 B2 * | 11/2017 | Wolfe | A63B 71/0619 | |
| 10,201,735 B2 | 2/2019 | Goldberg | | |
| 2003/0097730 A1 * | 5/2003 | Leufen | E05B 17/0016 | 16/110.1 |
| 2006/0043085 A1 * | 3/2006 | Meyers | A63C 11/222 | 219/204 |
| 2008/0272103 A1 * | 11/2008 | Farrington | H05B 3/06 | 15/105 |
| 2022/0256810 A1 * | 8/2022 | Hughes, III | A01K 27/004 | |

OTHER PUBLICATIONS

Generic, Bowhilt Heated Bow Grip, Black, BHUHBGBLK, retrieved from Internet, retrieved on May 31, 2023, <URL: https://www.amazon.com/Bowhilt-Heated-Grip-Black-BHUHBGBLK/dp/B09P6WWG69>.

Unigram, UniGram is lauching the hottest new grip, litteraly!, retrieved from Internet, retrieved on May 31, 2023, <URL: https://www.archerytalk.com/threads/unigram-is-lauching-the-hottest-new-grip-litteraly.5674065/>.

* cited by examiner

*Primary Examiner* — John E Simms, Jr.

(57) ABSTRACT

A heated bow grip includes a bow, a channel, a heating element, a power port, a first heat-conductive plate, and a second heat-conductive plate. The channel traverses through a grip section of the bow so that the heating element can be internally mounted to the grip section through a channel-wall of the channel. The power port is integrated onto a riser of the bow. The heating element is electrically connected to the power port so that the heating element can be heated from an external power source via the charging port. The first heat-conductive plate and the second heat-conductive plate are oppositely positioned of each other about the channel and removably mounted to the grip section. The heating element is enclosed by the first heat-conductive plate and the second heat-conductive plate thus allowing the heating element to transfer thermal energy to the first heat-conductive plate and the second heat-conductive plate.

7 Claims, 9 Drawing Sheets

HEATED BOW GRIP

FIELD OF THE INVENTION

The present invention relates generally to outdoor sport accessories. More specifically, the present invention is a heated bow grip that is integrated into outdoor sport equipment such as compound bows and cross bows.

BACKGROUND OF THE INVENTION

In a world full of different hobbies and interests, many people enjoy spending time outdoors. Hunting and fishing are two of the most popular pastimes for people that enjoy outdoor sports. Sports like hunting and fishing require particular equipment for each in order for one to truly partake in these sports. Hunters typically have a wider selection of equipment than anglers (those who fish with a hook and a line), having the choice of a variety of firearms or an assortment of bows. Bowhunting is a type of hunting that utilizes archery to hunt animals rather than firearms. While hunting has designated seasons for individuals to partake in, typically in warmer months, others may enjoy practicing outdoors during the offseason. Outdoor hunting for those in colder climates can be difficult as the colder weather and wind can be harsh on the exposed hands of bow hunters when they grip their respective equipment. More specifically, compound bow hunters and cross bow hunters have difficulties hunting in cold climate conditions as they have to hold on the respective bows for longer period of time.

An objective of the present invention is to provide bow hunters with a heated bow grip so that bow hunting can be comfortable and enjoyable while out in lower ambient temperatures. The present invention is a heating apparatus that is built into the grip section of the bow so that the user's hand can be warmed. The present invention includes an internal heating element that transfers thermal energy to a pair of heat-conductive plates that are mounted to the grip section of the bow. As the grip section of the bow is grasped by the user, the pair of heat-conductive plates warms the exposed hands of bow hunters, making these activities more enjoyable in colder temperatures.

DETAIL DESCRIPTIONS OF THE INVENTION

All illustrations of the drawings are for the purpose of describing selected versions of the present invention and are not intended to limit the scope of the present invention.

Figure 1:
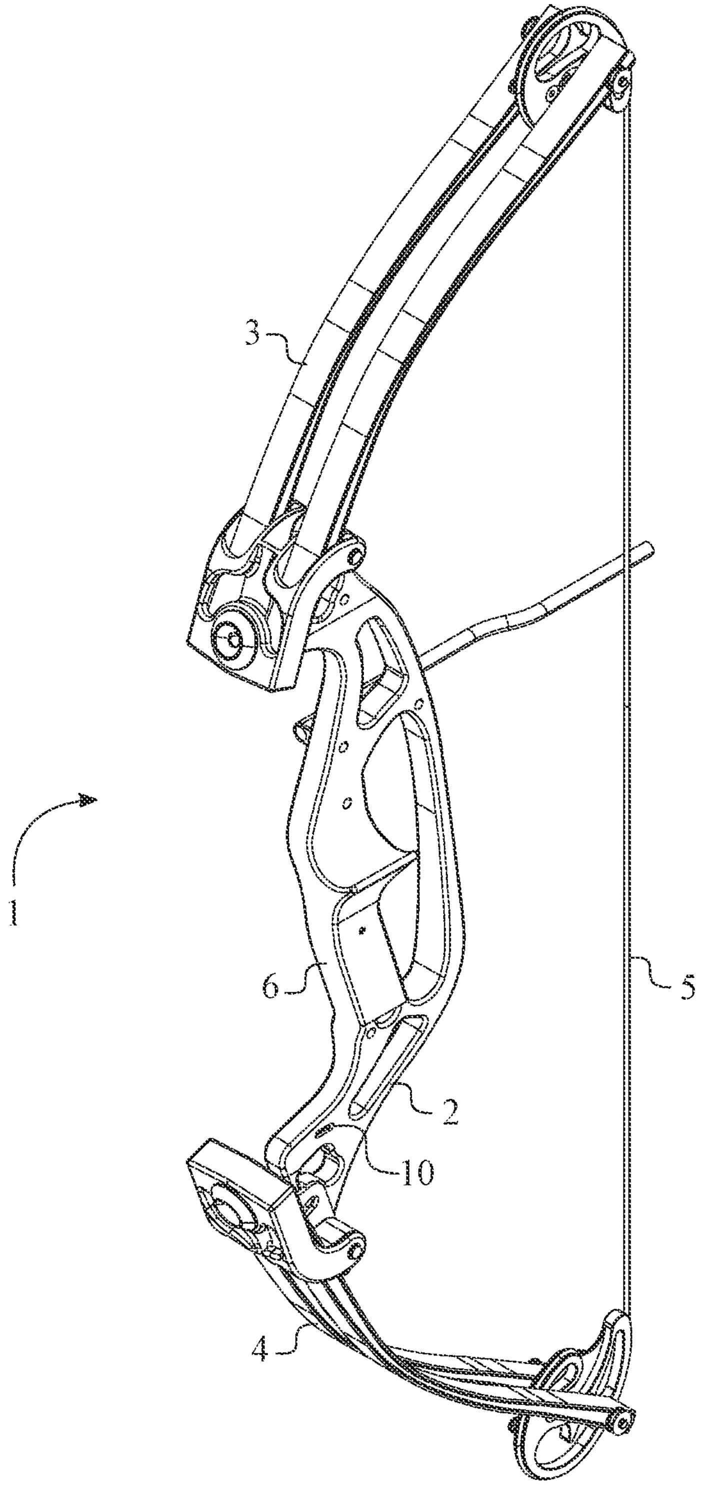
FIG. 1 is a front perspective view of the present invention.
Figure 2:
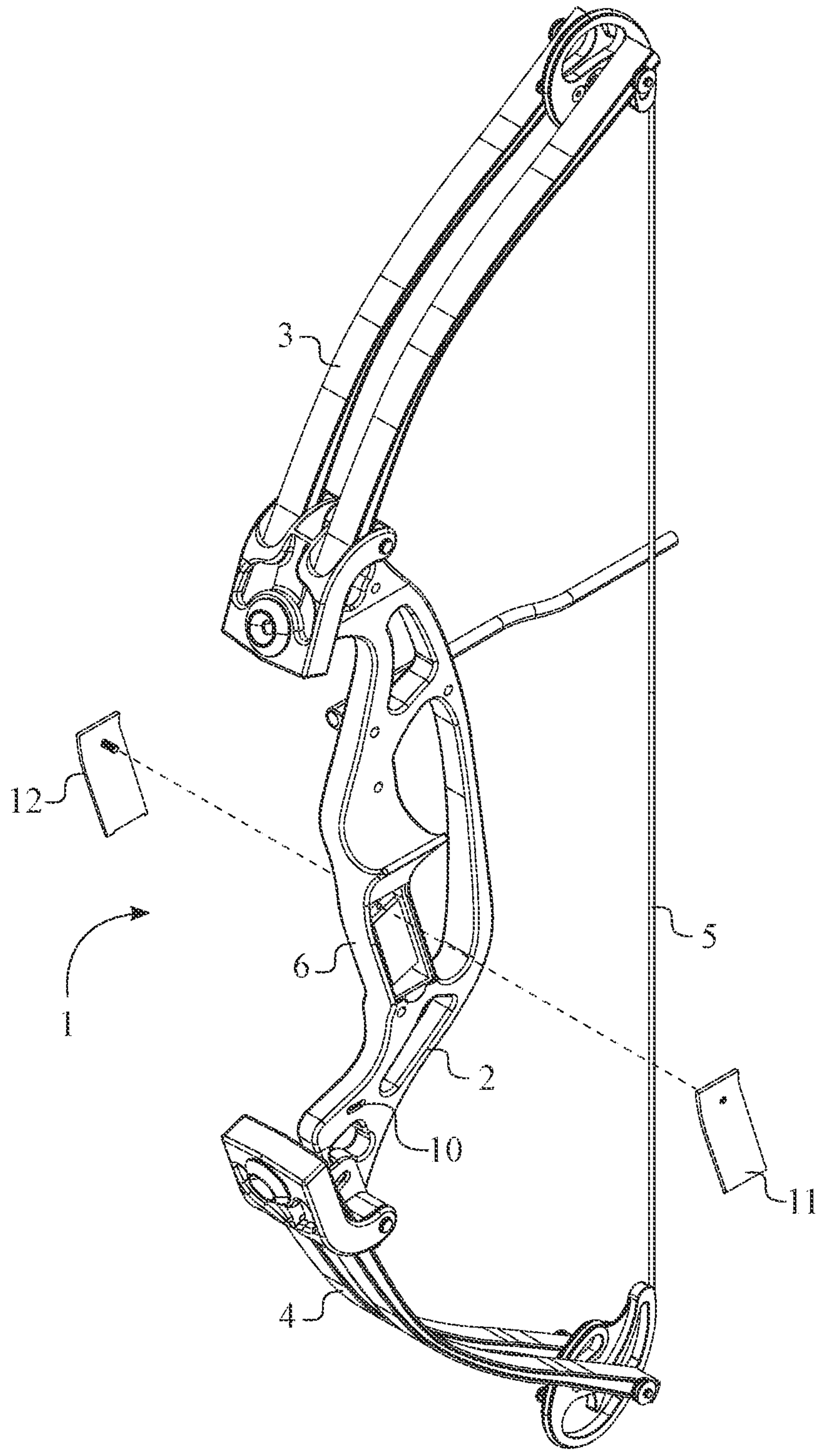
FIG. 2 is an exploded view of the present invention showing the removal of the first heat-conductive plate and the second heat-conductive plate.

The present invention is a heated bow grip that can be integrated into a compound bow or a cross bow. The present invention provides bow hunters with a more enjoyable experience when hunting in lower ambient temperatures by keeping their exposed hand warm for the duration of the hunting process. As shown in FIG. 1 and FIG. 2, the present invention comprises a bow 1, at least one heating element 9, a power port 10, a first heat-conductive plate 11, and a second heat-conductive plate 12. More specifically, the present invention enhances the functionality of a grip section 6 of the bow 1 thus providing warmth to user's hands.

Figure 3:
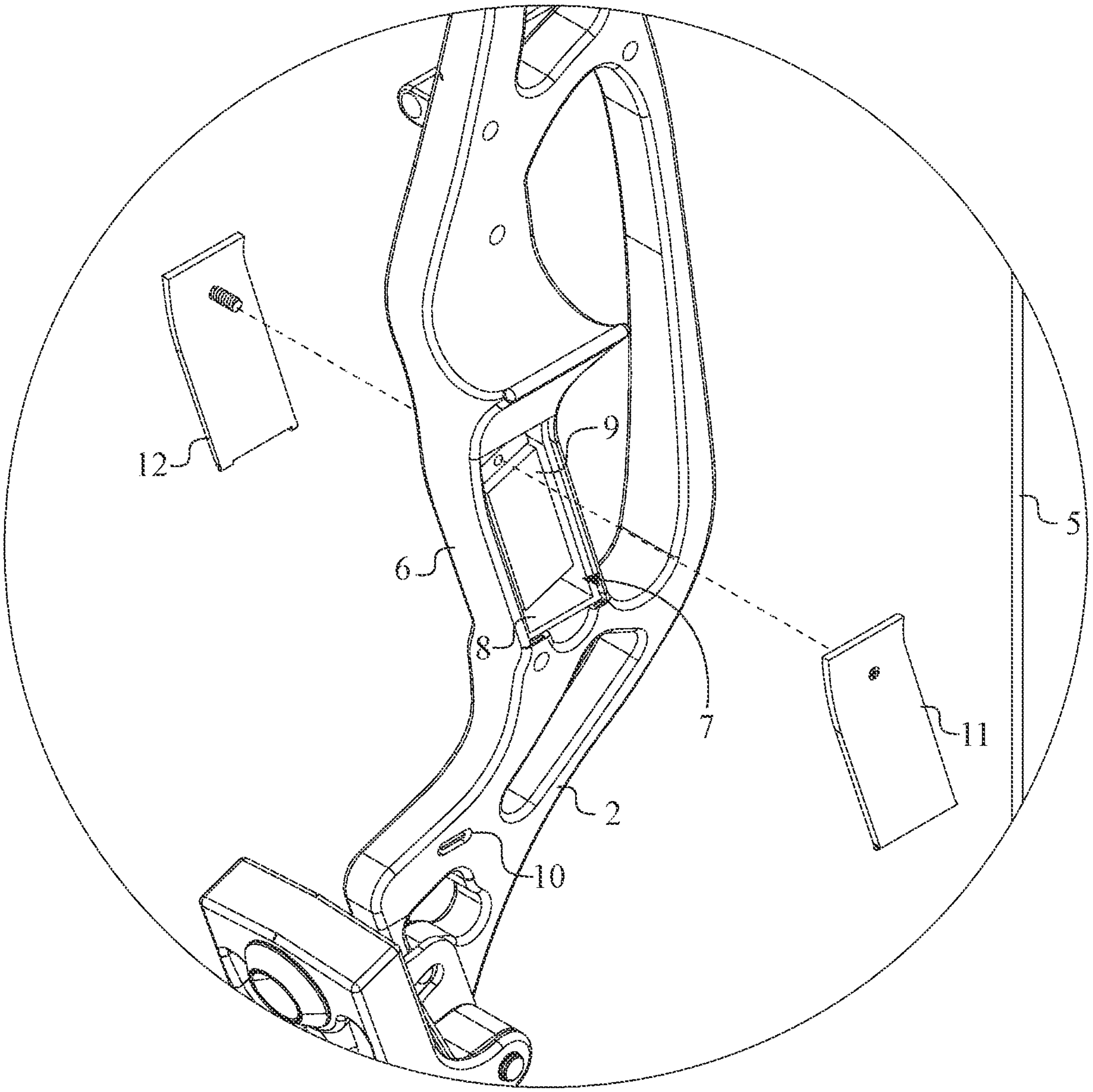
FIG. 3 is a detailed view of the present invention showing the removal of the first heat-conductive plate and the second heat-conductive plate.

In reference to the general configuration of the present invention, as shown in FIGS. 1-3, the heating element 9 is internally mounted to the grip section 6 and electrically powered through the power port 10. Resultantly, the heating element 9 is able to dissipate thermal energy into the first heat-conductive plate 11 and the second heat-conductive plate 12 as the first heat-conductive plate 11 and the second heat-conductive plate 12 are adjacently positioned to the heating element 9 and removably mounted to the grip section 6.

Figure 4:
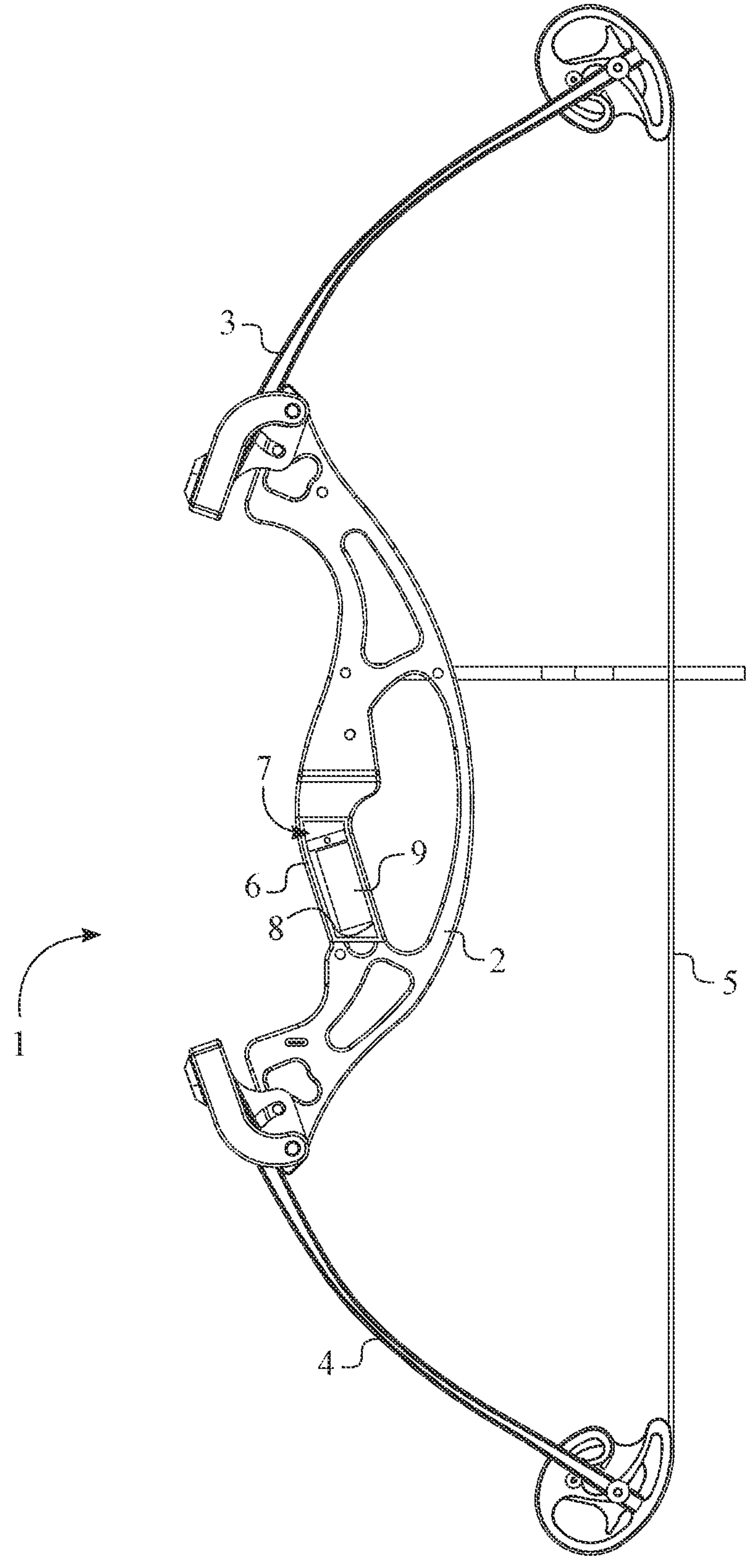
FIG. 4 is a side view of the bow showing the channel and the positioning of the heating element.

As shown in FIG. 1 and FIG. 4, the bow 1 can be any type of compound bows or cross bows that exist within the industry as the components configuration and the functionality remains unchanged. The bow 1 may further comprise a riser 2, a first limb assembly 3, a second limb assembly 4, and a string 5 in order to describe the basic functionality. The riser 2 functions as a rigid body of the bow 1 so that the first limb assembly 3 and the second limb assembly 4 can be mounted. More specifically, the first limb assembly 3 is terminally connected to the riser 2. The second limb assembly 4 is terminally connected to the riser 2 and positioned opposite of the first limb assembly 3. The first limb assembly 3 and the second limb assembly 4 flex inward and generates bow power to complete a shot. Once the shot is released, the first limb assembly 3 and the second limb assembly 4 return to their stationary positions. The string 5 is tethered in between the first limb assembly 3 and the second limb assembly 4 so that the user can pull back to shoot the bow 1 as the string 5 contacts with the arrow. The grip section 6 enables the user to steadily grasp and control the bow 1. Depending upon the type of bow 1, the exact positioning of the grip section 6 can also differ. In reference to compound bows, the grip section 6 is integrated into the riser 2 so that the user can grip and control the compound bow from one hand and pull back on the string 5 with the other hand. In reference to cross bows, the grip section 6 is positioned offset from the riser 2 so that the user can grip and control the cross bow from one hand and actuates an integrated trigger of the cross bow with the other hand. Even though the bow 1 is explained in relation to the abovementioned basic components, the bow 1 may further comprise other related components such as arrow shelfs, limb pockets, cams, axles, cam modules, stops, string 5 stops, speed nocks, cables, and other related components that are essential for the functionality.

In reference to FIG. 3 and FIG. 4, the channel 7 traverses through the grip section 6 from a first lateral side of the bow 1 to a second lateral side of the bow 1. In other words, a channel-wall 8 of the channel 7 is extended across the grip section 6 as a first channel-opening of the channel 7 is positioned about the first lateral side, and a second channel-opening of the channel 7 is positioned about the second lateral side. The channel 7 provides an empty area within the grip section 6 to position and mount the heating element 9.

Figure 6:
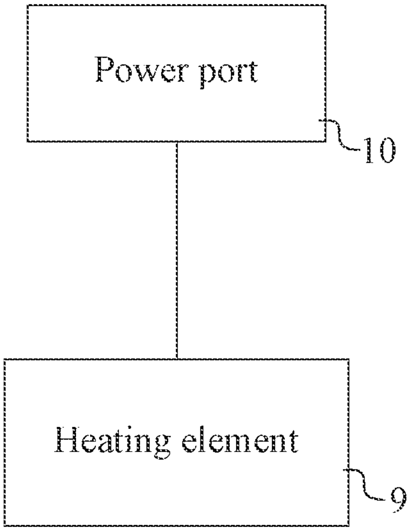
FIG. 6 is a basic illustration showing the electrical connections between the power port and the heating element.

In reference to FIG. 3 and FIG. 6, the power port 10 is integrated onto the riser 2 so that the user can easily access the power port 10 to plug in an external power source. Even though an industry standard power-port is utilized within the present invention as the power port 10, the shape and type of the power port 10 can differ based on the external power source. For example, I-type battery port is utilized as the power port 10 when the heating element 9 is powered from a 9-volt battery. A Universal Serial Bus (USB) port is utilized as the power port 10 when the heating element 9 is powered from a rechargeable battery pack with a USB power connection. Preferably, the present invention utilizes a USB-C port as the power port 10.

The heating element 9 converts electrical energy, preferably a direct current flow, into thermal energy. In reference to FIGS. 3-6, the heating element 9 is internally mounted to the channel-wall 8 of the channel 7 and electrically connected to the power port 10 so that the heating element 9 can be powered.

The first heat-conductive plate 11 and the second heat-conductive plate 12 function as the heated plated within the user's hand as the user grasp the grip section 6. In reference to FIG. 3, the first heat-conductive plate 11 and the second heat-conductive plate 12 are oppositely positioned of each other about the channel 7 so that the first channel-opening and the second channel-opening can be covered. More specifically, the first heat-conductive plate 11 is removably mounted to the grip section 6 and positioned about the first channel-opening so that the heating element 9 can be enclosed from the first lateral side of the bow 1. Similarly, the second heat-conductive plate 12 is removably mounted to the grip section 6 and positioned about the second channel-opening so that the heating element 9 can be enclosed from the second lateral side of the bow 1. When the heating element 9 is powered, the generated thermal energy of the heating element 9 is able to transfer into the first heat-conductive plate 11 and the second heat-conductive plate 12 via convective heat transfer thus resulting warmth to user's hand. Optionally, a heat-conductive protective film can be superimposed onto the first heat-conductive plate 11 and the second heat-conductive plate 12 to protect the first heat-conductive plate 11 and the second heat-conductive plate 12 from outside elements such as dirt and moisture.

Figure 5:
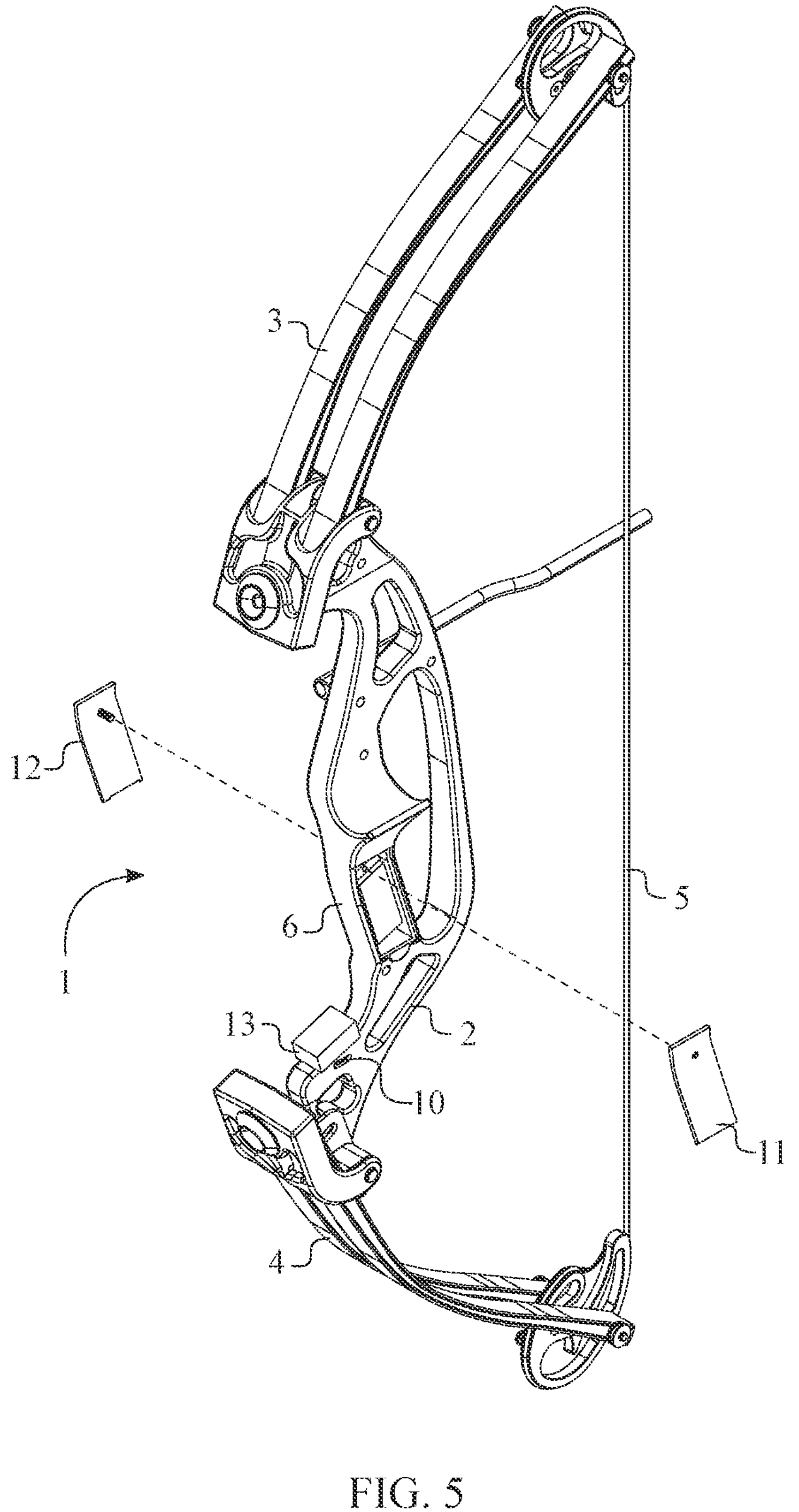
FIG. 5 is an exploded view of the present invention showing the removal of the first heat-conductive plate and the second heat-conductive plate, and the positioning of the portable charging unit.
Figure 7:
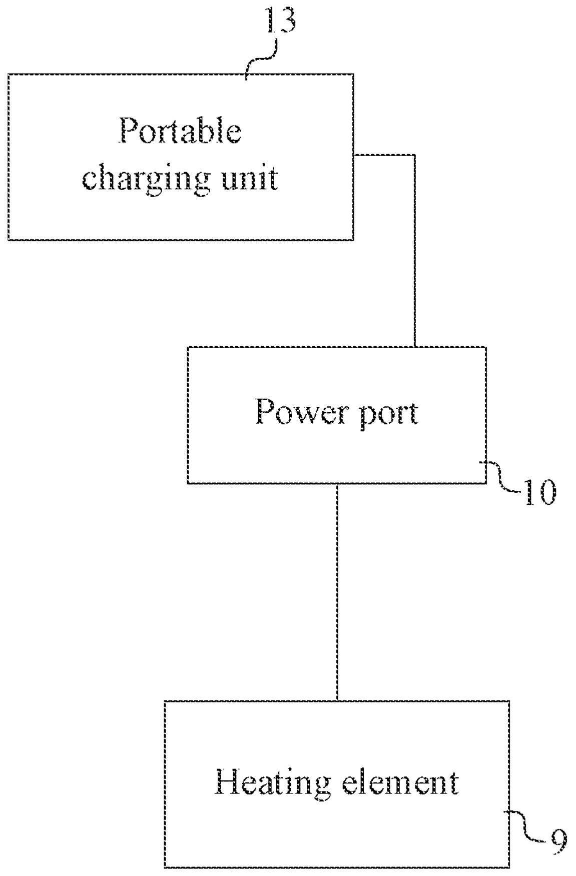
FIG. 7 is a basic illustration showing the electrical connections between the portable charging unit, the power port, and the heating element.

In reference to FIG. 5 and FIG. 7, the present invention may further comprise a portable charging unit 13 to extend the operation of the heating element 9. More specifically, the portable charging unit 13 is externally attached to the riser 2 of the bow 1 and electrically connected to the power port 10. For example, once the initial amount thermal energy generated within the heating element 9 is dissipated through the first heat-conductive plate 11 and the second heat-conductive plate 12, the user is able to generate a subsequent amount of thermal energy as a result of the electrical connection between the portable charging unit 13 and the power port 10.

Optionally, the present invention may comprise a controlling unit to control the amount of thermal energy. More specifically, the controlling unit is integrated into the riser 2 and externally accessible to the user. The controlling unit is powered through an integrated power source and electrically connected to the heating element 9 so that the user can control the amount of thermal energy that is transferred to the first heat-conductive plate 11 and the second heat-conductive plate 12. Furthermore, the riser 2 can also be constructed with heat-conductive material so that the generated thermal energy within the heating element 9 can also be transferred to the riser 2 via conduction heat transfer.

Figure 8:
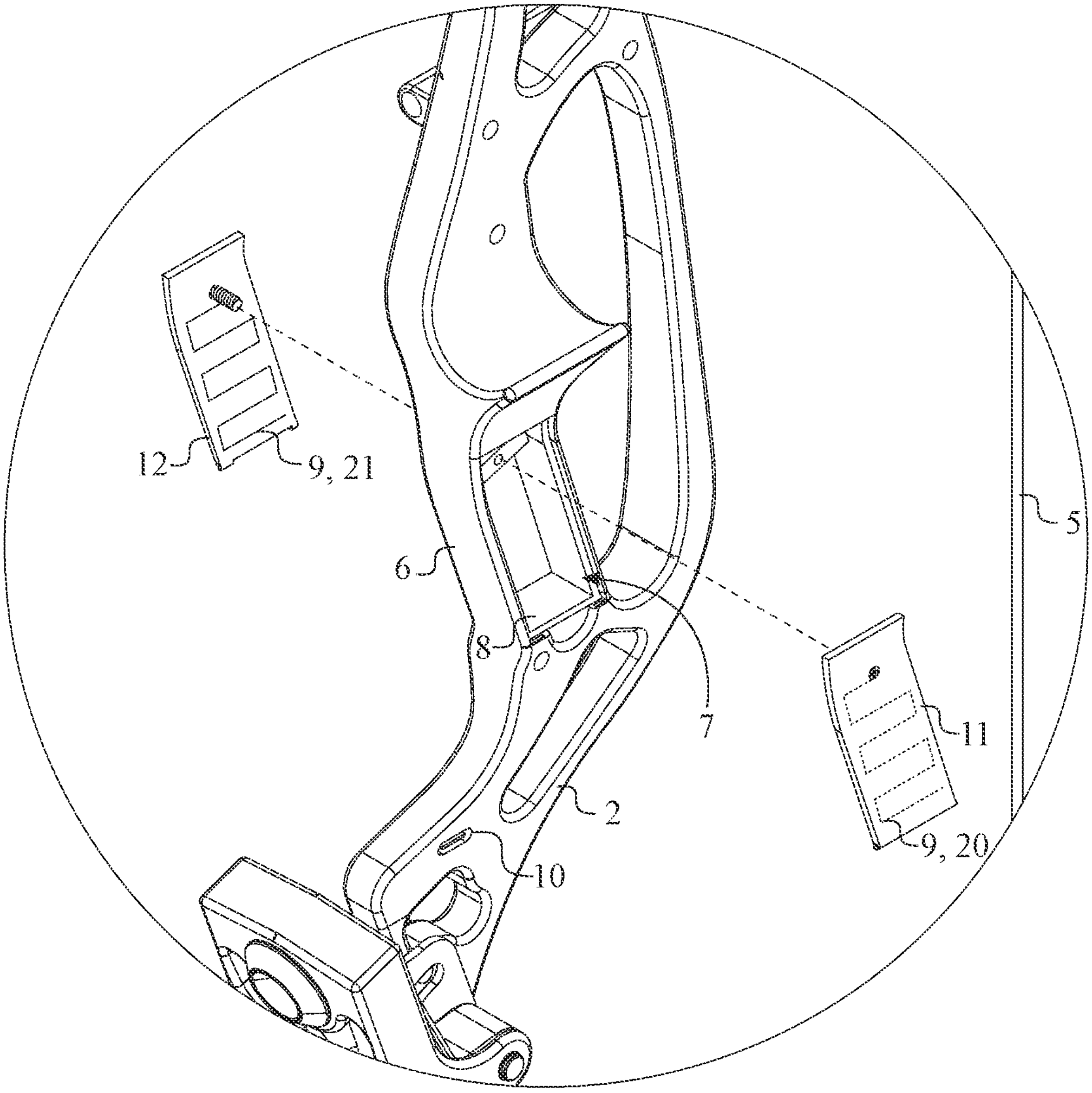
FIG. 8 is a detailed view of the present invention showing the removal of the first heat-conductive plate and the second heat-conductive plate, and the integration of the first heating element and the second heating element.
Figure 9:
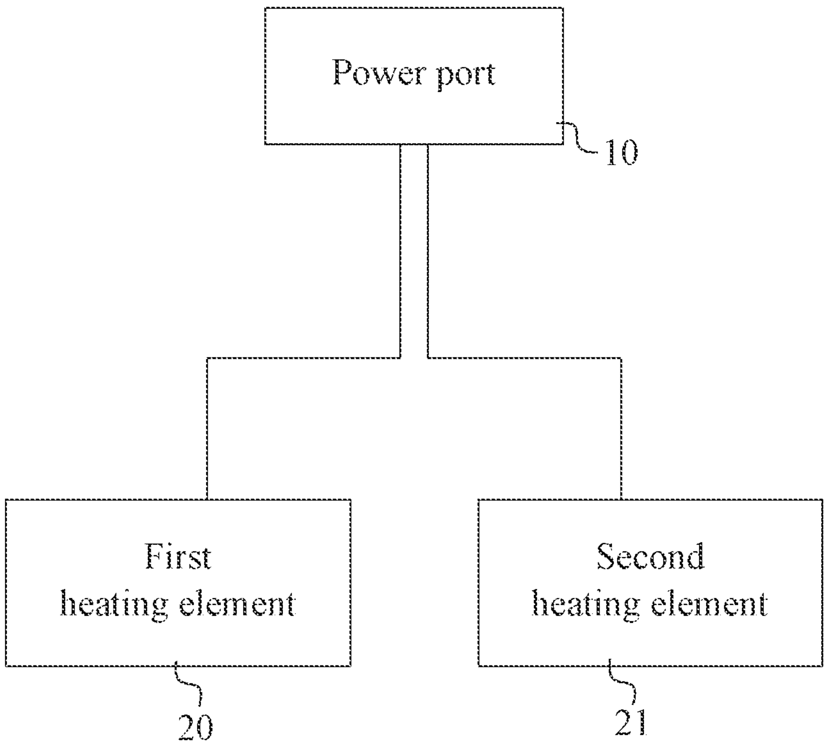
FIG. 9 is a basic illustration showing the electrical connections between the power port, the first heating element, and the second heating element.

Even though the preferred embodiment of the present invention is explained in such a way that the at least one heating element 9 is a separate component from the first heat-conductive plate 11 and the second heat-conductive plate 12, it is obvious that the at least one heating element 9 can be integrated into the first heat-conductive plate 11 and the second heat-conductive plate 12. More specifically, the at least one heating element 9 may comprise a first heating element 20 and a second heating element 21 as shown in FIG. 8 and FIG. 9. The first heating element 20 is integrated into the first heat-conductive plate 11 as the first heating element 20 is electrically connected to the power port 10. Similarly, the second heating element 21 is integrated into the second heat-conductive plate 12 as the second heating element 21 is electrically connected to the power port 10. As a result, the power port 10 is able to power both the first heating element 20 and the second heating element 21, thus converting electrical energy into thermal energy.

Once the present invention is integrated into the bow 1, the user can place their hand around the first heat-conductive plate 11 and the second heat-conductive plate 12 thus resting one's fingers and palm on the first heat-conductive plate 11 and the second heat-conductive plate 12. Resultantly, the present invention is able to provide warmth to the user's hand for the duration of the hunting process.

Although the invention has been explained in relation to its preferred embodiment, it is to be understood that many other possible modifications and variations can be made without departing from the spirit and scope of the invention as hereinafter claimed.

What is claimed is:

1. A heated bow grip comprising:
a bow;
a channel;
at least one heating element;
a power port;
a first heat-conductive plate;
a second heat-conductive plate;
the channel traversing through a grip section of the bow;
the power port being integrated onto a riser of the bow;
the heating element being electrically connected to the power port;
the first heat-conductive plate and the second heat-conductive plate being oppositely positioned of each other about the channel;
the first heat-conductive plate and the second heat-conductive plate being removably mounted to the grip section; and
the heating element being enclosed by the first heat-conductive plate and the second heat-conductive plate.

2. The heated bow grip as claimed in claim 1 comprising:
the bow further comprises a first limb assembly, a second limb assembly, and a string;
the first limb assembly being terminally connected to the riser;
the second limb assembly being terminally connected to the riser, opposite of the first limb assembly; and the string being tethered in between the first limb assembly and the second limb assembly.

3. The heated bow grip as claimed in claim 2, wherein the grip section is integrated into the riser.

4. The heated bow grip as claimed in claim 2, wherein the grip section is positioned offset from the riser.

5. The heated bow grip as claimed in claim 1 comprising:

a portable charging unit;

the portable charging unit being externally attached to the riser of the bow; and the portable charging unit being electrically connected to the power port.

6. The heated bow grip as claimed in claim 1, wherein the heating element is internally mounted to a channel-wall of the channel.

7. The heated bow grip as claimed in claim 1 comprising:

the at least one heating element comprising a first heating element and a second heating element;

the first heating element being mounted onto the first heat-conductive plate;

the second heating element being mounted onto the second heat-conductive plate;

the first heating element being electrically connected to the power port; and the second heating element being electrically connected to the power port.

* * * * *